April 19, 1927.

S. J. DICKEY 1,625,195

PROCESS OF AND APPARATUS FOR TREATING ONE LIQUID BY ANOTHER

Original Filed Jan. 16. 1923

INVENTOR:
SAMUEL J. DICKEY,
BY
ATTORNEYS.

Patented Apr. 19, 1927.

1,625,195

UNITED STATES PATENT OFFICE.

SAMUEL J. DICKEY, OF LOS ANGELES, CALIFORNIA, ASSIGNOR TO GENERAL PETROLEUM CORPORATION OF CALIFORNIA, A CORPORATION OF DELAWARE.

PROCESS OF AND APPARATUS FOR TREATING ONE LIQUID BY ANOTHER.

Original application filed January 16, 1923, Serial No. 613,064. Divided and this application filed May 14, 1924. Serial No. 713,339.

My invention can be best explained by referring to a concrete example of its use, although it is capable of many uses. For the purpose of illustration, I have selected the treatment of kerosene by acid. Kerosene, as it comes from the usual refining process, contains many impurities which affect its color and odor and it is a common practice to treat such kerosene with acids and alkalis and to wash it with water for the purpose of improving its color and odor. My invention may be used in various ways in this process, but for the purpose of simplicity of description I will describe it as applied to the acid treatment of kerosene, without, of course, limiting my invention to this particular step in the process of refining kerosene.

In the treatment of kerosene with acid, as now practiced in the art of oil refining, the acid is passed through the kerosene, which is carried in suitable tanks or agitators. The acid, being heavier than the kerosene, tends to sink into the bottom of the tanks, and it is necessary if any considerable degree of commercial efficiency is to be attained that the acid and kerosene be intimately mixed and that they be held in contact with each other for a sufficient period for the acid to act upon the kerosene. This is at present accomplished, to some degree, by the use of agitation in the tanks, this agitation being sometimes produced by blowing air through the mass of acid and kerosene in the tank. The present methods of treating kerosene require large and expensive agitators and the mixture of oil and acid must remain in them for considerable periods, thus requiring large investment in such agitators and a correspondingly large loss through depreciation and cost of operation.

It is an object of my invention to provide a method and apparatus by which the kerosene may be treated by acid at a low cost and by which the investment in agitators may be very greatly reduced over that at present necessary when using the commonly employed processes.

The acid, by continued contact with the kerosene becomes exhausted, forming an acid sludge. The further this exhaustion is carried, the lower the cost of acid will be, and it is a further object of my invention to provide a method and apparatus in which the acid may be almost completely exhausted without requiring a large investment of agitators or a long continued treatment of the kerosene.

Further objects and advantages will be made evident hereinafter.

Referring to the drawings, which are for illustrative purposes only,

Fig. 2 is a sectional view showing diagrammatically a detail hereinafter referred to.

Figure 2:
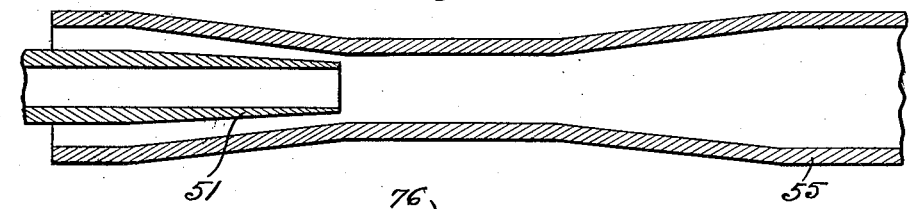
Figure 1:
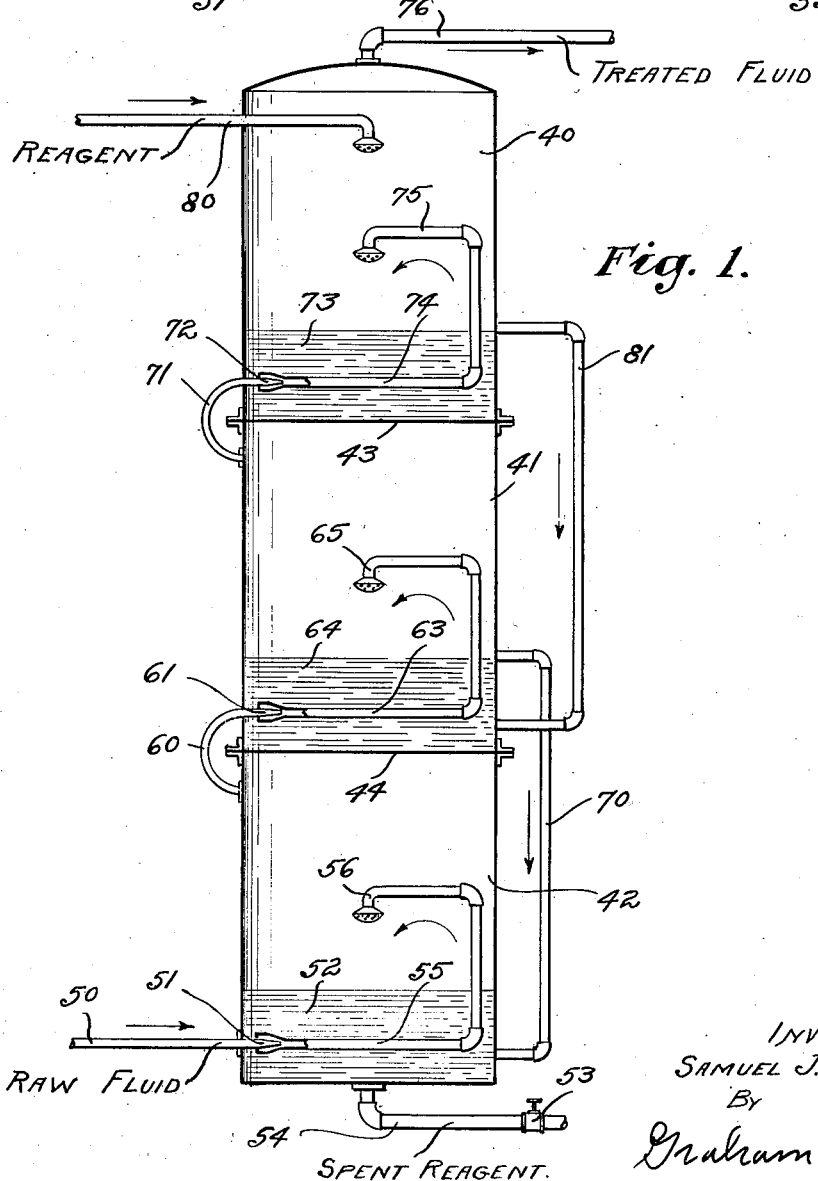
Fig. 1 is a somewhat diagrammatic elevational sectional view of one advantageous form of apparatus suitable for use in the practice of my invention.

My economies in the treatment of, for example, a raw oil with an acid, may be obtained by the use of the apparatus illustrated, in which 40, 41 and 42 are tanks shown as superimposed, one upon the other, being separated by partitions 43 and 44. Three tanks are shown, but more or less may be used, if found convenient. The kerosene is delivered through a pipe 50 into an injector 51 which is fed acid sludge from a body of sludge shown at 52, the level of this sludge being maintained by means of a valve 53 in a spent sludge pipe 54, by means of the valve 53. The kerosene and acid are mixed in a pipe 55 and are delivered through a distributor 56 into the tank 42. Acid sludge may be continuously drawn off through the pipe 54 and partially treated kerosene is then delivered through a pipe 60 from the top of the tank 42 to an ejector 61 and into a pipe 63 which is fed with sludge, from a body of sludge 64 carried at the bottom of the tank 41, the mixture from the pipe 63 being delivered through a distributor 65 into the tank 41.

The level of the sludge in the tank 41 is maintained by a pipe 70, this pipe connecting into the tank 41 at a desired level and delivering the sludge into the body of sludge in the lower tank.

In the event that the sludge falls below the level of the pipe 70 in the tank 41 and oil enters this pipe, the oil will not flow downwardly due to the fact that the tank 42 is under slightly higher pressure than the tank 41. The sludge will, however, flow downwardly due to its being heavier than the oil and the body of the sludge 64 is automatically maintained.

Partially treated kerosene is then taken from the top of the tank 41 through a pipe 71 and delivered into an injector 72 which takes sludge from a body of sludge 73 in the bottom of the tank 40, this sludge and oil being mixed in a pipe 74 and delivered through distributor 75 into the tank 40. Cleaned oil is delivered from the tank 40 through a pipe 76 in the extreme top thereof.

The level of the sludge in the tank 40 is maintained by constantly supplying acid through a pipe 80 and by supplying a pipe 81 which connects into the tank 40 at the desired level of the sludge delivering the acid sludge into the body of sludge 64 in the tank 41. In the event that the level of the body of sludge 73 falls below the inlet end of the pipe 81, oil starts to flow into this pipe, but the flow ceases almost immediately due to the fact that the tank 41 is under higher pressure than the tank 40 which can only be overcome due to the fact that the acid is heavier than the oil.

It will be seen that the fresh oil introduced into the pipe 50 is first treated with very nearly spent sludge, the sludge in the body of sludge 52 being much more nearly spent than the sludge at 64, and the sludge 64 being much more nearly spent than the sludge at 73. Fresh acid is supplied through the pipe 80; the result is that the oil is successively treated with a higher activity of acid, being finally treated with fresh acid in the tank 40. By thus passing the acid in one direction through the device in counter-current with the flow of oil, a very high economy of acid consumption is obtained.

The form of my invention above described is disclosed, but not specifically claimed, in my mentioned co-pending application, Serial No. 613,064, filed Jan. 16, 1923, of which this application is a division.

In the practice of my invention by the use of equipment of the character described, it may be desirable to employ several sets of similar apparatus, through which the kerosene or other liquid to be treated may be conducted, and in which the same may be subjected, as by repeated mixings and sprayings, to reagents differing in strength or in other characteristics. It is thus possible to introduce a crude or impure material at one end of the system, and to withdraw from the opposite end thereof a product in suitable condition for use or sale.

While I have described my invention as used in the treatment of kerosene by means of acid, I do not wish to be understood as thereby intending to limit myself to this particular use of my apparatus, but on the contrary, I wish it to be distinctly understood that my invention is defined solely by the appended claims.

I claim as my invention:

1. The continuous method of treating an oil with a liquid reagent heavier than and insoluble in the oil, which comprises: maintaining in each of a series of substantially closed tanks arranged in rising order a layer of reagent of predetermined depth, continuously introducing fresh reagent into the uppermost tank, overflowing the reagent from one tank into the tank next below at a point below the surface of the layer of reagent in such lower tank, continuously withdrawing spent reagent from the lowermost tank at such rate as to maintain the predetermined level of reagent therein, simultaneously injecting into the lowermost tank a stream of raw oil under pressure, drawing into such stream a stream of reagent from the reagent body in said tank, intermixing the two streams through the agency of the velocity of the stream of raw oil and discharging the intermixed stream into said tank, the treated oil and the reagent continuously separating by gravity difference in said tank, injecting the once-treated oil from the bottom tank into the tank next above, repeating the intermixture, discharge, separation and upward conveyance of oil from tank to tank until the uppermost tank is reached, and finally discharging the completely treated oil from an outlet at the top of the uppermost tank of the series.

2. The continuous method of treating an oil with a liquid reagent heavier than and insoluble in the oil, in which the oil to be treated is counterflowed against the treating liquid in a series of substantially closed tanks arranged in rising order, which consists in introducing fresh reagent into the uppermost tank and flowing said reagent by gravity downwardly through the series, the reagent becoming more and more spent in each successive tank until it reaches the lowermost tank, drawing the completely spent reagent from such lowermost tank at a rate substantially equal to the rate of feed of fresh reagent, introducing raw oil under pressure into the lowermost tank of the series, and flowing it under pressure upwardly through the series, the oil becoming more and more highly treated in each successive tank by contact with progressively less spent reagent until it reaches the uppermost tank, where it is treated with fresh reagent, and discharging the completely treated oil from the uppermost tank, the oil and reagent in counterflow being continuously intermixed in each tank by injecting the oil under pressure into such tank, drawing into each stream of oil a stream of the reagent contained in such tank, and intermixing the two streams by means of the velocity of the oil stream, the pressure for producing the upward flow of oil and for the injection thereof into each successive tank being applied solely at the point of entry of the raw oil into the lowermost tank.

3. An apparatus for the continuous treatment of an oil with a liquid reagent heavier than and insoluble in the oil, which comprises: a plurality of vessels arranged in rising order, the upper vessel provided with an inlet for fresh reagent and an outlet for treated oil near its top, said upper vessel further provided at a point near its bottom with an outlet for partly-spent reagent connected with the next lower vessel at a point close to its bottom, the lower vessel provided with a valve-controlled outlet for spent reagent, the lower vessel further provided with a pipe conveying raw oil under pressure into the vessel and an injector into which said pipe discharges, the lower vessel further provided with a pipe connection between its upper end and the next upper vessel, and an injector into which said connecting pipe discharges, said respective injectors opening on their suction side into the respective vessels near their bottoms.

4. The continuous method of treating an oil with a liquid reagent heavier than and insoluble in the oil, which comprises: maintaining in rising order a series of bodies of liquid, the lower portion of each body consisting of a reagent in process of being exhausted, the upper portion of each body consisting of oil in process of being treated, continuously introducing fresh reagent into the uppermost body, overflowing the reagent from one liquid body into the lower portion of the liquid body next below, continuously withdrawing spent reagent from the lowermost body at such rate as to maintain a constant relative level of reagent in such body, simultaneously injecting into the lowermost body a stream of raw oil under pressure, drawing into such stream a stream of reagent from the said lowermost body, intermixing the two streams through the agency of the velocity of the stream of raw oil and discharging the stream into the liquid body from which the reagent is drawn, the treated oil and the reagent continuously separating from each other by gravity difference in said body, injecting the once treated oil from the upper portion of the bottom body into the liquid body next above in the series, repeating the intermixture, discharge, separation and upward conveyance of oil from body to body until the uppermost liquid body is reached, and finally discharging the completely treated oil from the upper portion of the uppermost liquid body.

5. The continuous method of treating an oil with a liquid reagent heavier than and insoluble in the oil, in which the oil to be treated is counterflowed against the treating liquid in a series of liquid bodies arranged in rising order, the lower portion of each body consisting of reagent in the process of being exhausted, the upper portion of each body consisting of oil in the process of being treated, which consists in introducing fresh reagent into the uppermost body and flowing said reagent by gravity downwardly through the series, the reagent becoming more and more spent in each successive body until it reaches the lowermost liquid body, drawing the completely spent reagent from such lowermost body at a rate substantially equal to the rate of feed of fresh reagent, introducing raw oil under pressure into the lowermost liquid body of the series and flowing it under pressure upwardly through the series, the oil becoming more and more highly treated in each successive liquid body by contact with progressively less spent reagent until it reaches the uppermost body where it is treated with fresh reagent, and discharging the completely treated oil from the upper part of the uppermost liquid body, the oil and reagent in counterflow being continuously intermixed in each of said liquid bodies by injecting the oil under pressure into such body, drawing into each stream of oil a stream of the reagent from the lower portion of said liquid body and intermixing the two streams by means of the velocity of the oil stream, the pressure for producing the upward flow of oil and for the injection thereof into each successive liquid body being applied solely at the point of entry of the raw oil into the lowermost liquid body.

In testimony whereof, I have hereunto set my hand at Los Angeles, California, this 7th day of May, 1924.

SAMUEL J. DICKEY.